(12) United States Patent
Smith (10) Patent No.: US 8,388,243 B1
(45) Date of Patent: Mar. 5, 2013

(54) APPARATUS FOR HOLDING A PORTABLE MEDIA DEVICE

(76) Inventor: Harold Bernard Smith, Scottsdale, AZ (US)

( * ) Notice: Subject to any disclaimer, the term of this patent is extended or adjusted under 35 U.S.C. 154(b) by 71 days.

(21) Appl. No.: 13/171,437

(22) Filed: Jun. 28, 2011

Related U.S. Application Data (60) Provisional application No. 61/359,025, filed on Jun. 28, 2010.

(51) Int. Cl.
*G03B 17/12* (2006.01)

(52) U.S. Cl. ................. 396/422; 455/575.8

(58) Field of Classification Search ............ 396/27, 396/420–422; 455/575.8
See application file for complete search history.

(56) References Cited

U.S. PATENT DOCUMENTS

| | | | | |
|---|---|---|---|---|
| 3,019,715 | A * | 2/1962 | Arnold et al. .......... | 396/27 |
| 4,431,290 | A * | 2/1984 | Kennedy ................ | 396/325 |
| 5,121,147 | A | 6/1992 | Wada et al. | |
| D332,459 | S * | 1/1993 | Morimiya .............. | D16/208 |
| 5,305,030 | A * | 4/1994 | Yokoyama et al. .... | 396/27 |
| 6,068,223 | A * | 5/2000 | Navarro ................. | 248/187.1 |
| 6,384,863 | B1 | 5/2002 | Bronson | |
| 7,128,354 | B2 * | 10/2006 | Wu ......................... | 294/139 |
| 7,422,379 | B2 * | 9/2008 | Agevik et al. ......... | 396/424 |
| 7,494,291 | B2 * | 2/2009 | Saxton ................... | 396/420 |
| 7,555,325 | B2 * | 6/2009 | Goros .................... | 455/575.8 |
| D602,096 | S * | 10/2009 | Ashida et al. ......... | D21/333 |
| 7,621,681 | B2 * | 11/2009 | DeSorbo ............... | 396/420 |
| 2002/0168189 | A1 * | 11/2002 | Mulcahy ............... | 396/422 |
| 2005/0270484 | A1 | 12/2005 | Maeda et al. | |
| 2006/0126883 | A1 | 6/2006 | Thalheimer et al. | |
| 2007/0280677 | A1 | 12/2007 | Drake et al. | |
| 2008/0095525 | A1 | 4/2008 | Maggert et al. | |
| 2009/0321593 | A1 * | 12/2009 | Foddis .................. | 248/187.1 |
| 2011/0084081 | A1 * | 4/2011 | Chung et al. ......... | 220/628 |

OTHER PUBLICATIONS

"OWLE News and Updates", retrieved from http://www.youtube.com/watch?v=E_CVOgsNl9w.*
"Launch info and some face time with your new OWLE Bubo", retrieved from http://www.youtube.com/watch?v=woUv_7ACE4E.*
Review of "Game Grip" case for the iPhone 3G™, dated Nov. 18, 2008 retrieved from http://www.ilounge.com/index.php/reviews/entry/marware-game-grip-for-iphone-3g-ipod-touch-2g/.*
iphone Tripod Holder, website, Oct. 21, 2009.
iPhone Deluxe Mounting System, website, Oct. 21, 2009.
Rotatable Tripod Stand Holder for Camera Mobile Phone Cellphone, Tripod Stand Holder, website, Oct. 21, 2009.

(Continued)

*Primary Examiner* — Clayton E LaBalle
*Assistant Examiner* — Leon W Rhodes, Jr.
(74) *Attorney, Agent, or Firm* — Booth Udall Fuller, PLC (57) ABSTRACT

An apparatus for holding a portable media device may include a body including: a pair of spaced apart and opposing handles, each handle comprising a flat bottom surface; a recess that is configured to removably receive and hold a portable media device therein, the recess comprising a through aperture defined through a bottom surface of the recess; a first through port across one handle that opens into a first side of the recess; a second through port that opens into a second side of the recess; a third through port across the opposite handle that opens into a third side of the recess; threaded sockets, one at each top and bottom corner of the body at ends of the handles; and a shoe bracket at a top of the body between the handles.

16 Claims, 9 Drawing Sheets

OTHER PUBLICATIONS

PED3-TriPhone Rotating iPhone Tripod Mount and Holder, website, Oct. 21, 2009.
XShot iPhone Case with Tripod Mount, website, Oct. 21, 2009.
Zacuto Zgrip iPhone PRO, website, Oct. 21, 2009.
Zacuto Zgrip iPhone Jr., website, Oct. 21, 2009.
Griffin Black iPhone 3G Clarifi Protective Case With Built-In Close-Up Lens, website, Oct. 21, 2009.
Portable Tripod Speakers for iPod with 3.5mm Mini-Jack and 2.5mm Adapter, website, Oct. 21, 2009.
Blur Tripod for iPhone, website, Oct. 21, 2009.

* cited by examiner

APPARATUS FOR HOLDING A PORTABLE MEDIA DEVICE

CROSS-REFERENCE TO RELATED APPLICATIONS

This application claims the benefit of the filing date of U.S. Provisional Patent Application 61/359,025 entitled "APPARATUS FOR HOLDING A PORTABLE MEDIA DEVICE" to Harold Bernard Smith, filed on Jun. 28, 2010, the disclosure of which being hereby incorporated entirely herein by reference.

BACKGROUND

1. Technical Field

This document relates generally to portable media devices and more particularly to an apparatus for holding a portable media device.

2. Background

The introduction of consumer video formats such as VHS, VHS-C, and mini DV resulted in camcorders becoming much smaller and more available to the general public. Similarly, digital cameras have become much smaller and less expensive, while also increasing resolution and picture quality. The advent of the Internet and video sharing sites such as YouTube, DailyMotion, and Vimeo and photo sharing sites such as Flickr and Picasa make it very easy for people to create and share both still and moving video images. The ability to share photos and video via the Internet has been greatly improved by portable media devices that can both connect to the Internet and record moving images. The most popular of these devices is the Apple iPhone, which is a smart phone and has the ability to record video and take pictures. YouTube has been another beneficiary of the success of the iPhone, with a 1600% increase in mobile uploads since the introduction of the iPhone 3GS for example.

For all the benefits of a portable media device to capture video, these types of devices suffer from several problems. For example, the video produced from these devices is often shaky. This is a result of the size of the devices, the way in which the devices are held (typically in front of the user, using one or two hands), and the light weight nature of the devices. In addition, the audio from these devices is often not high quality and the built in microphones are designed primarily for phone communication. As such, the location and audio characteristics of the microphone are different from a device designed for the purpose of capturing audio from a distance. The lens on many of these devices has a fixed focal length as well. Thus, a user cannot view things at a wide angle perspective or from a telephoto perspective. The video and photo quality may be sufficient when a subject is well-lit (e.g., outdoors or in a well-lit interior), but the quality decreases greatly as the level of light goes down.

SUMMARY

Aspects of this document relate to an apparatus for holding a portable media device (e.g., iPhone and other smart phones) that can accommodate a wide variety of accessories, such as a light for video or a flash for still photos, and readily mount or trigger such accessories, while still being convenient to carry. These aspects may comprise, and implementations may include, one or more or all of the components and steps set forth in the appended CLAIMS, which are hereby incorporated by reference.

The foregoing and other aspects and implementations of an apparatus for holding a portable media device may have one or more or all of the following advantages, as well as other benefits discussed elsewhere in this document.

Implementations of an apparatus for holding a portable media device are the simplest and most versatile way to take and share video and images. Implementations take an existing portable media device a user already has and transforms it into a fully functional imaging device by integrate mounts that allow for the interchangeability of lenses, lighting, and audio sources. Implementations may have tri pod mounting points allowing a user to perfect image capturing. Implementations can stand on their own allowing for hands free photography as well. An integrated cold shoe mounting point makes using lights or microphones simple, and ergonomic design promotes ease of hand held shooting. A user has a large area to hold the portable media device, thus giving the user a more stable way to hold the portable media device. The holding area also prevents the user from inadvertently covering the lens or microphone. Tailored weight allows for greater control and no more shaky "cell phone video" affects. Implementations even protect portable media devices from damage during use as a camera. Implementations may be provided in a kit and may come with accessories such as a full size lens that provides crisp image quality, as well as an external microphone that captures audio that can be shared. Thus, a user has the ability to include a higher quality microphone to capture sounds, as well as the ability to choose from various focal lengths for the lens.

The foregoing and other aspects, features, and advantages will be apparent to those of ordinary skill in the art from the DESCRIPTION and DRAWINGS, and from the CLAIMS.

BRIEF DESCRIPTION OF DRAWINGS

Implementations will hereinafter be described in conjunction with the appended DRAWINGS (which are not necessarily to scale), where like designations denote like elements, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DESCRIPTION

This document features implementations of an apparatus for holding a portable media device. There are many features of these implementations disclosed herein, of which one, a plurality, or all features or steps may be used in any particular implementation.

The foregoing and other aspects, features, and advantages will be apparent to those of ordinary skill in the art from this DESCRIPTION and the DRAWINGS. In the following description, reference is made to the accompanying DRAWINGS which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

Structure

There are a variety of implementations of an apparatus for holding a portable media device. Implementations may generally be a mount or housing having a recess or cavity for a portable media device (e.g., iPhone), as well as dual grip handles to allow for greater image stabilization, a through aperture for a camera phone lens, a port for inserting audio connections like microphones, a port to access media buttons, socket(s) for tripod mount, a port for power or data connections, and a shoe bracket (e.g., cold or hot) for expansion with accessories. Some implementations may have a threaded connection configured to surround a camera phone lens for removably coupling other lenses and filters.

Notwithstanding, turning to FIGS. 1-10 and for the exemplary purposes of this disclosure, apparatus 1 is shown for holding a portable media device, such as a smart phone like the iPhone. While this implementation is used in conjunction with an Apple iPhone, it should be understood that implementations can be made for other portable media devices, including phones, digital cameras, and camcorders.

Figure 3:
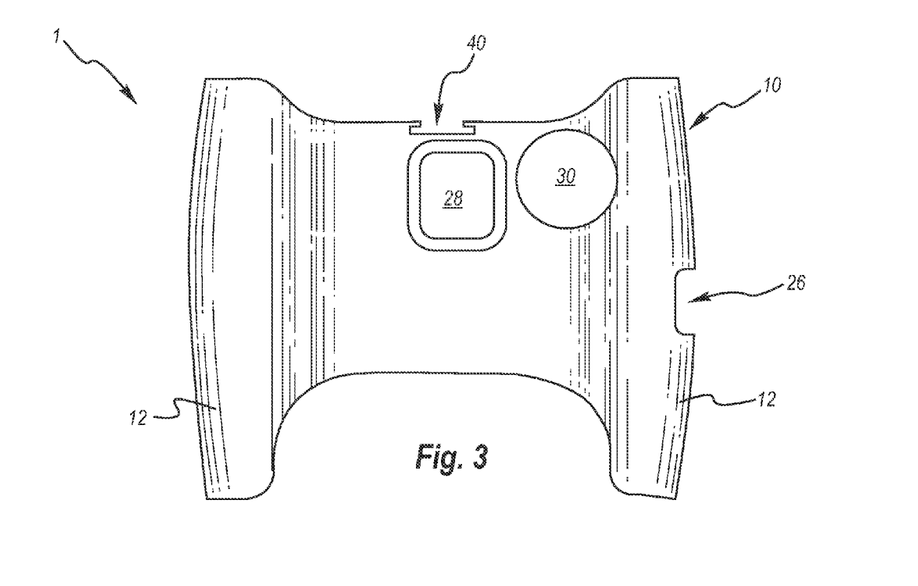
Figure 4:
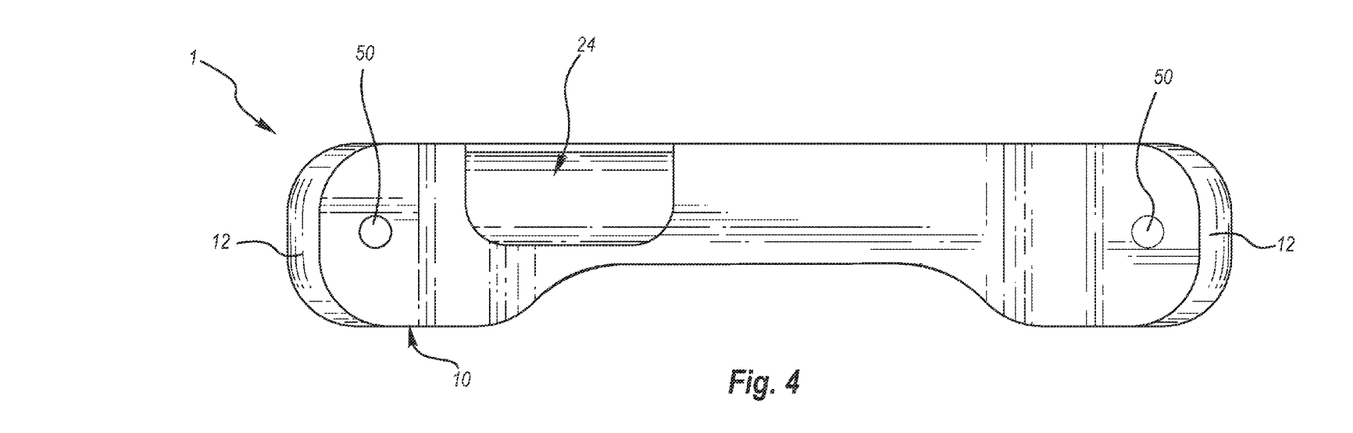
FIGS. 4-5 are bottom and top views, respectively, of the apparatus implementation of FIG. 1.
Figure 5:
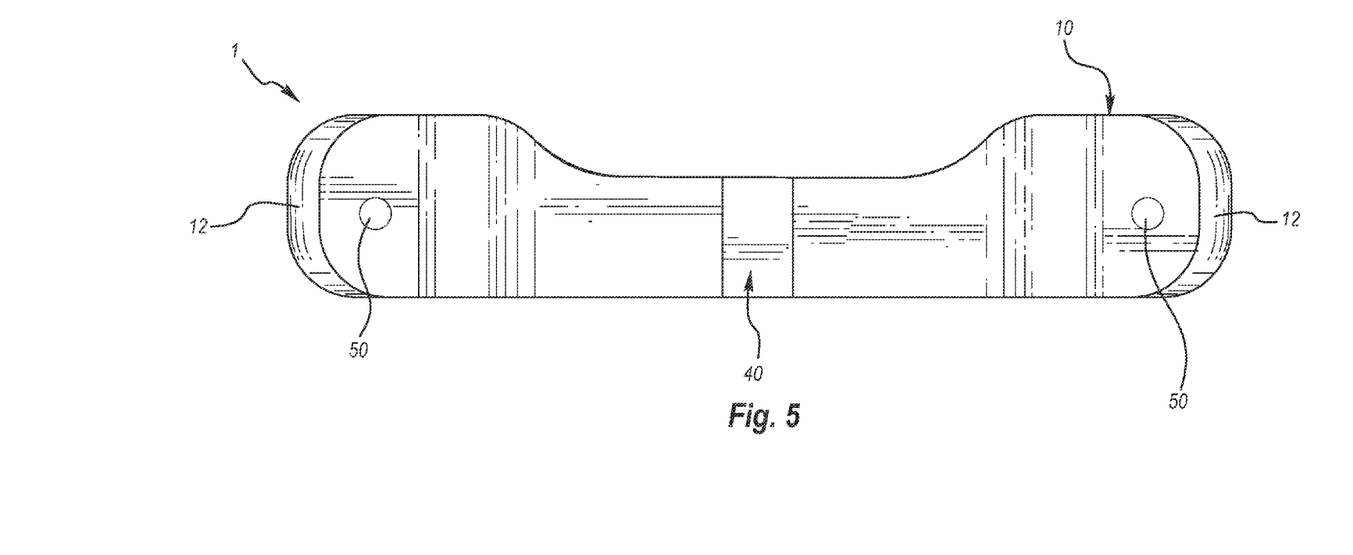
Figure 6:
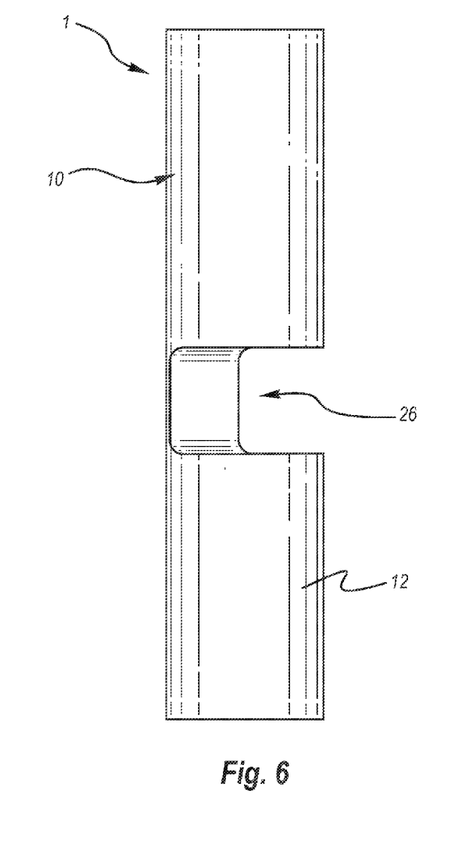
FIGS. 6-7 are left and right views, respectively, of the apparatus implementation of FIG. 1.
Figure 7:
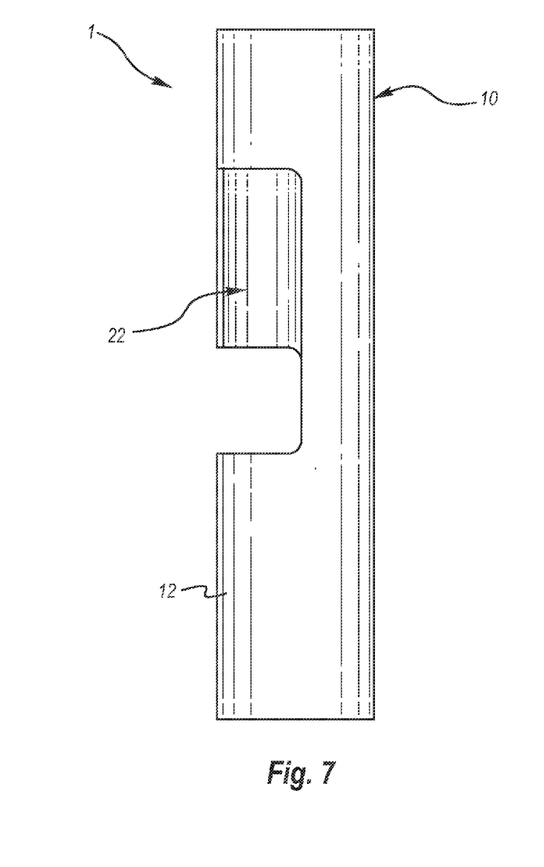

FIGS. 1, 2, 8, and 9 show views from the perspective the user would see. FIGS. 3 and 10 show views from the perspective a subject being filmed would see.

Figure 1:
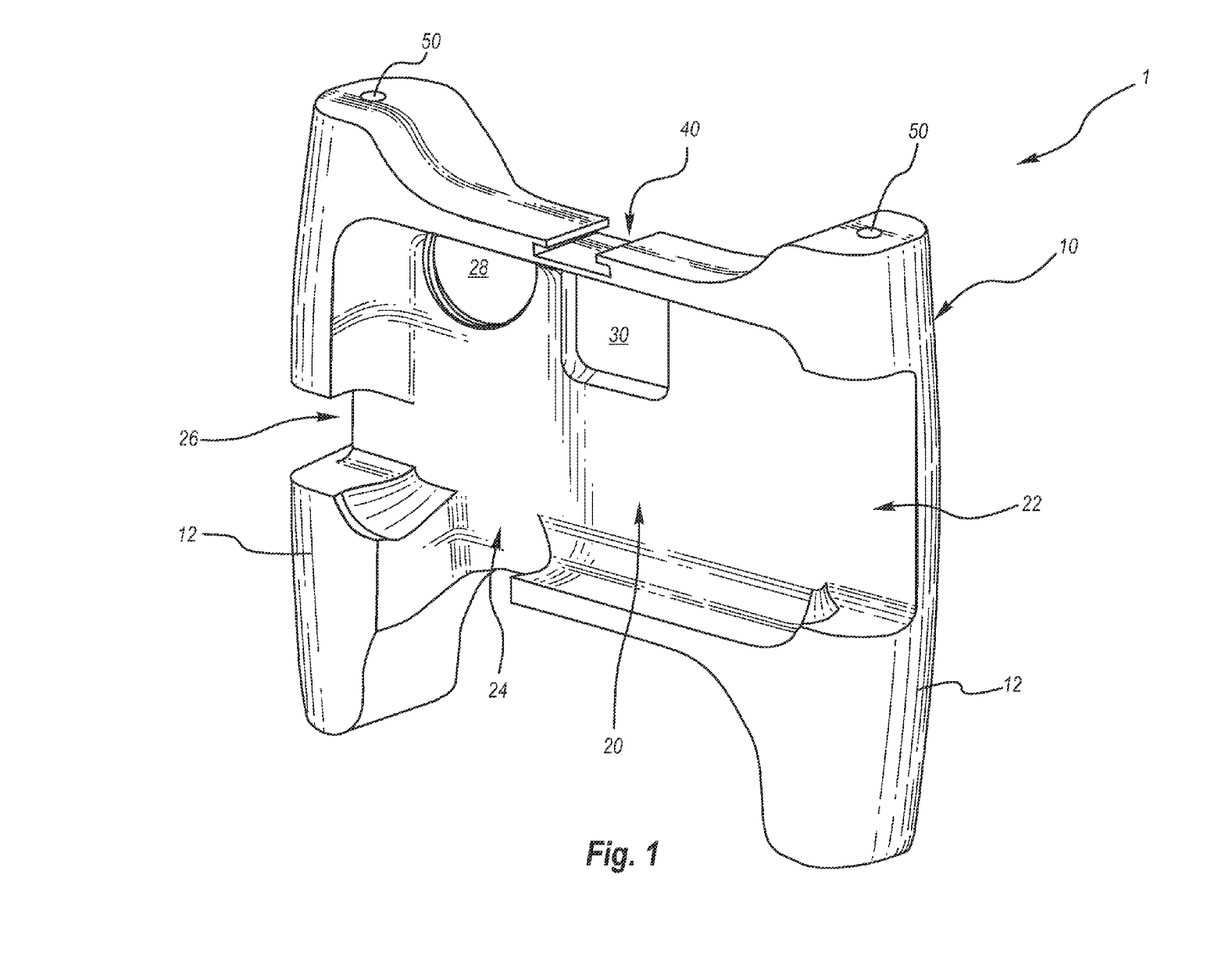
FIG. 1 is a back perspective view of an implementation of an apparatus for holding a portable media device.
Figure 2:
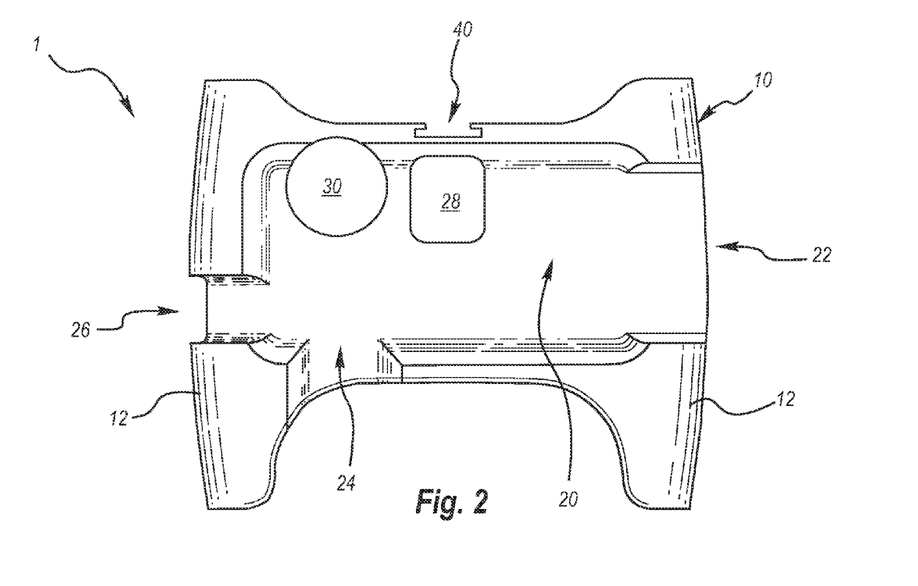
FIGS. 2-3 are back and front views, respectively, of the apparatus implementation of FIG. 1.

Apparatus 1 is a mount or housing that includes a body 10. The size of portable media devices like the iPhone and similar devices is not conducive to holding in a steady manner. In addition, the location of the camera and the microphone make on such devices make it easy for one to accidentally cover the camera lens, the microphone, or both. Accordingly, body 10 includes lower dual grip handles 12 that enable a user to hold the portable media device more steadily to provide greater image stabilization. Additionally, handles 12 give the user an area to place their hands that lessens the chance of a user inadvertently covering the microphone or the camera lens. Handles 12 may each have a flat bottom surface configured to allow apparatus 1 to stand on its own allowing for hands free photography. Thus, body 10 may have a substantially H shape or inverted U shape.

Body 10 also defines recess or cavity 20 on a back face thereof that is configured to removably receive and hold a portable media device (e.g., iPhone) therein. This recessed area is of a size and shape to securely hold the portable media device by friction fit. Body 10 also defines (through the upper left of the bottom surface of recess 20) a through aperture 28 for a camera phone lens.

Body 10 also defines (through the upper middle of the bottom surface of recess 20) an ejection through aperture 30 that a user can utilize to uninstall a portable media device from recess 20.

Body 10 also defines a through port 26 across the left handle 12 opening into the left side of recess 20 that allows for the insertion of audio connections like microphones. Body 10 also defines a through port 24 opening into the lower side of recess 20 that allows a user's finger to access media buttons (e.g. volume buttons or switch) on the portable media device. Body 10 also defines a through port 22 across the right handle 12 opening into the right side of recess 20 that allows for insertion of external power or data connections like chargers or battery packs.

Through aperture 28 may be threaded as shown for removably coupling other lenses and filters in front of the camera phone lens. Alternatively, a threaded counter-bore may be included around through aperture 28 at the upper right of the front face of body 10 to provide a flat base and a threaded connection to accommodate different lenses, filters, and the like.

Body 10 also defines four threaded sockets 50, one at each top and bottom corner of body 10 (at the ends of handles 12). Sockets 50 are standard-sized sockets so that a user can place apparatus 10 on a tripod for an even steadier image, or connect other devices or accessories that can couple with threaded sockets 50. Less or more sockets 50 could be provided and included at other locations around body 10.

Body 10 also defines a shoe bracket 40 (e.g., cold or hot) that allows for expansion with accessories. Shoe 40 comprises a through flanged channel that extends across the thickness of body 10 and is located at the top of body 10. Shoe 40 can be either be coupled to or integrally formed or defined by body 10. Shoe 40 may be a traditionally sized connector that can hold a variety of readily-available accessories, including lights, microphone stands, levels, viewfinders, and the like. In one implementation, the shoe mount can be a "hot shoe" mount that transmits power and signaling information. In the implementation depicted in the figures, shoe 40 may be a "cold shoe" mount that does not have any power or signaling connections and is only used to mount an accessory.

There are a variety of implementations of a portable media device system. Implementations may generally include an apparatus for holding a portable media device and the portable media device itself removably coupled or mounted to the apparatus. Some implementations may include an external microphone for better sounding audio and direction and external lenses and filters. Some implementations may even have a battery pack, grooves on handles to manage cables, and an area to store small accessories or excess cable inside the body. Some implementations could also be hooked up to an external monitor, viewfinder or eyepiece for example. Thus, a consumer can attach their own devices to apparatus implementations via universal mounts, etc. to form a wide variety of systems.

Figure 8:
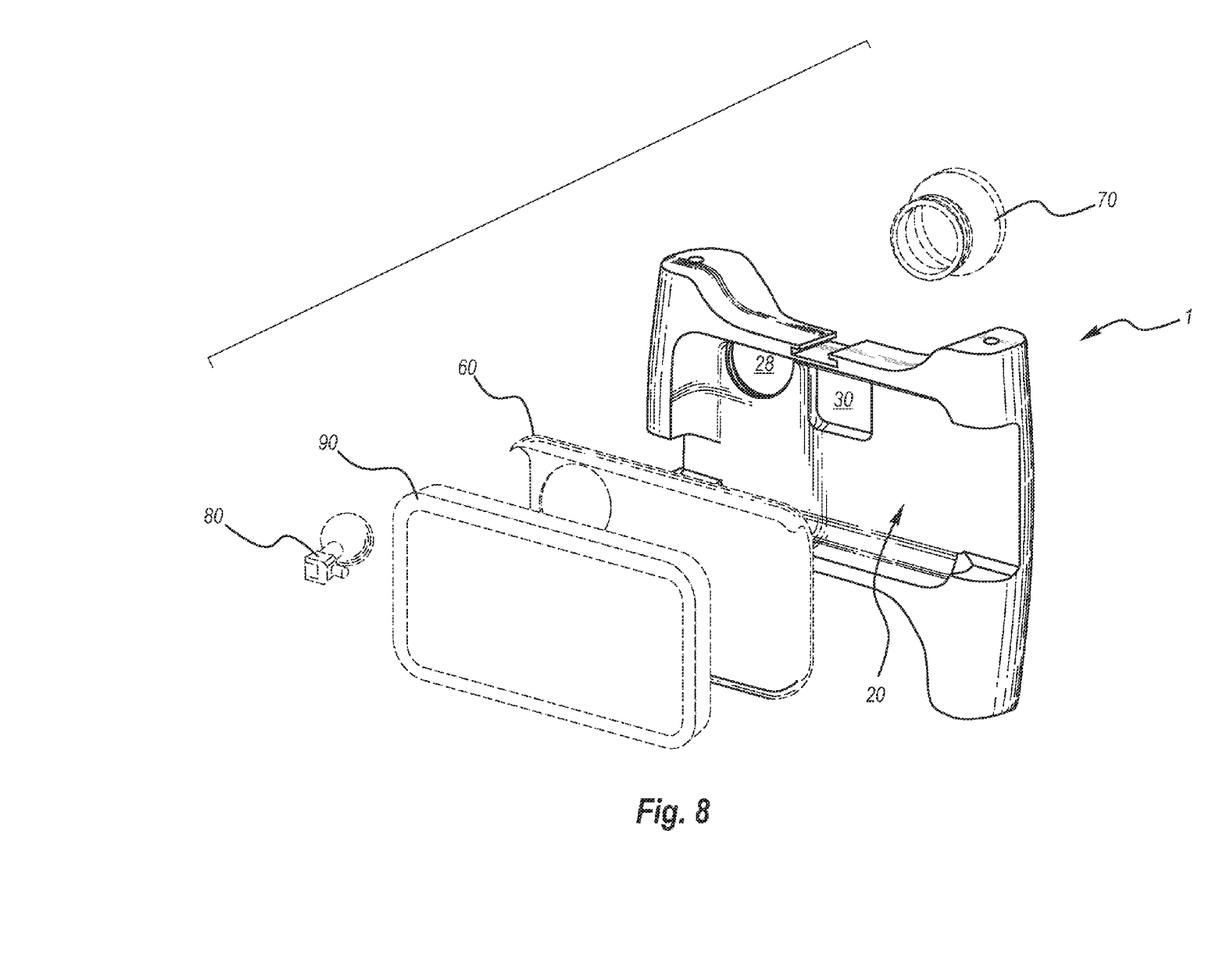
FIG. 8 is an exploded back perspective view of an implementation of a portable media device system including the apparatus implementation of FIG. 1.
Figure 9:
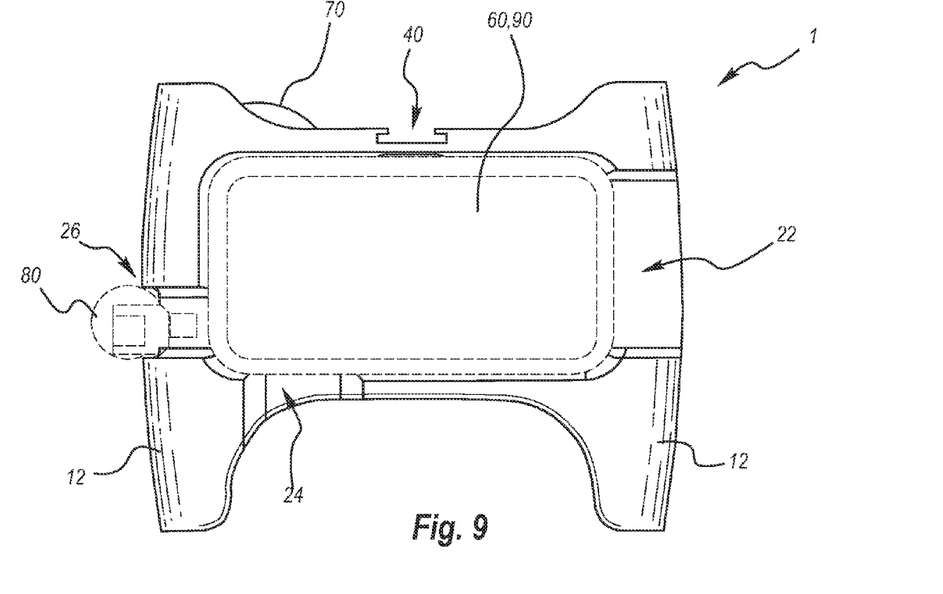
FIGS. 9-10 are back and front views, respectively, of the system implementation of FIG. 8.
Figure 10:
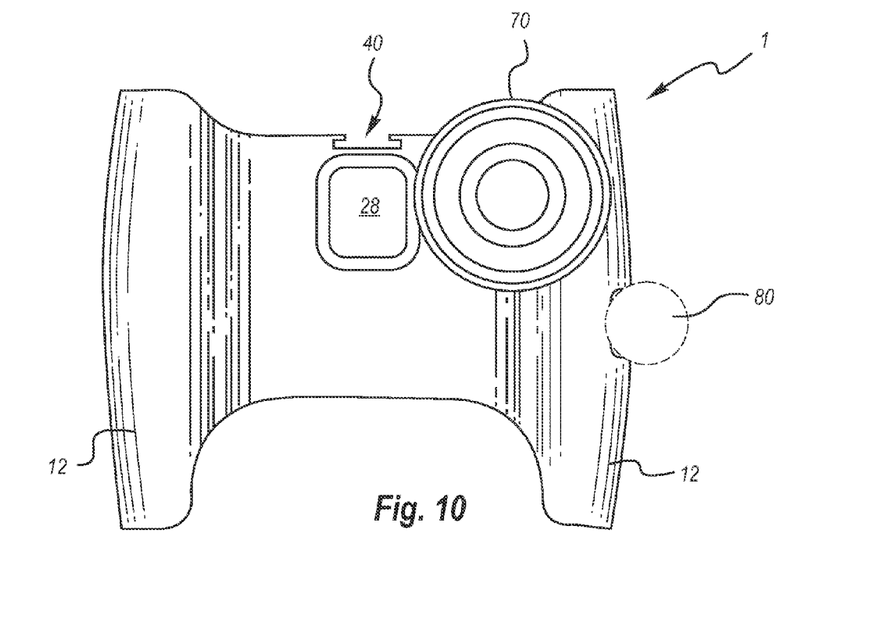

Notwithstanding, turning to FIGS. 8-10 and for the exemplary purposes of this disclosure, a portable media device system is shown including a smart phone 90 like the iPhone. While this implementation is used in conjunction with an Apple iPhone, it should be understood that implementations can be made for other portable media devices, including phones, digital cameras, and camcorders.

FIGS. 8 and 9 show views from the perspective the user would see. FIG. 10 shows a view from the perspective a subject being filmed would see.

The system includes apparatus 1 as previously described. The system also includes a portable media device such as iPhone 90 installed in apparatus 1. Specifically, to facilitate the friction fit securement of phone 90 into recess 20 of body 10 of apparatus 1, case 60 may be included that is resilient and flexible. Case 60 slips around phone 90 and then that assembly is press fit into recess 20.

Thus, a portable media device such as the iPhone 90 is press fit placed in recess 20 using case 60. The top of the iPhone 90 is pointed towards the left of the recess 20 so that its lens is aligned with through aperture 28. iPhone 90's headphone/microphone jack is aligned with through port 26 for the insertion of audio connections like microphone 80, which may be an articulating arm microphone. iPhone 90's media buttons are aligned with through port 24 for access by a user. iPhone 90's dock connector is aligned with through port 22 for insertion of external power or data connections like chargers or battery packs.

When a user wants to use lens 70, lens 70 is threaded onto through aperture 28. Lens 70 may be any type of lens such as a 3.37 mm 0.45× wide-angle/macro combo lens for example. The Apple iPhone 90 has a fixed focal length that may not be wide enough for people desiring a wide angle view and may not be narrow enough for people desiring a telephoto view. Thus the lens 90 can be screwed in front of the iPhone 90 lens to provide a wide angle or telephoto viewpoint. In one implementation, there may be a variety of lenses 70 available for use. Thus, a user may be able to switch between a wide angle lens, a telephoto lens, and the standard iPhone lens. In another implementation, a zoom lens may be used so that the user can use a single external lens and have access to multiple focal lengths. In another implementation, the lens 70 may be attached via a pivot point such that the external lens can be pivoted in front of the standard lens when needed and pivoted out of the way when not in use.

In one implementation, a battery pack may be coupled to iPhone 90 through port 22. In an alternative implementation, a battery pack may be coupled to a light on shoe 40.

When a user wants to release and remove phone 90 from recess 20, all that is required is to push on phone 90 through aperture 30 from the front face of body 10. Alternatively if nothing is connected to phone 90 through any one of ports 22, 24, or 26, then a user can engage phone 90 through any of those ports and pull phone 90 out of recess 20.

Other Implementations

Many additional implementations are possible.

Figure 11:
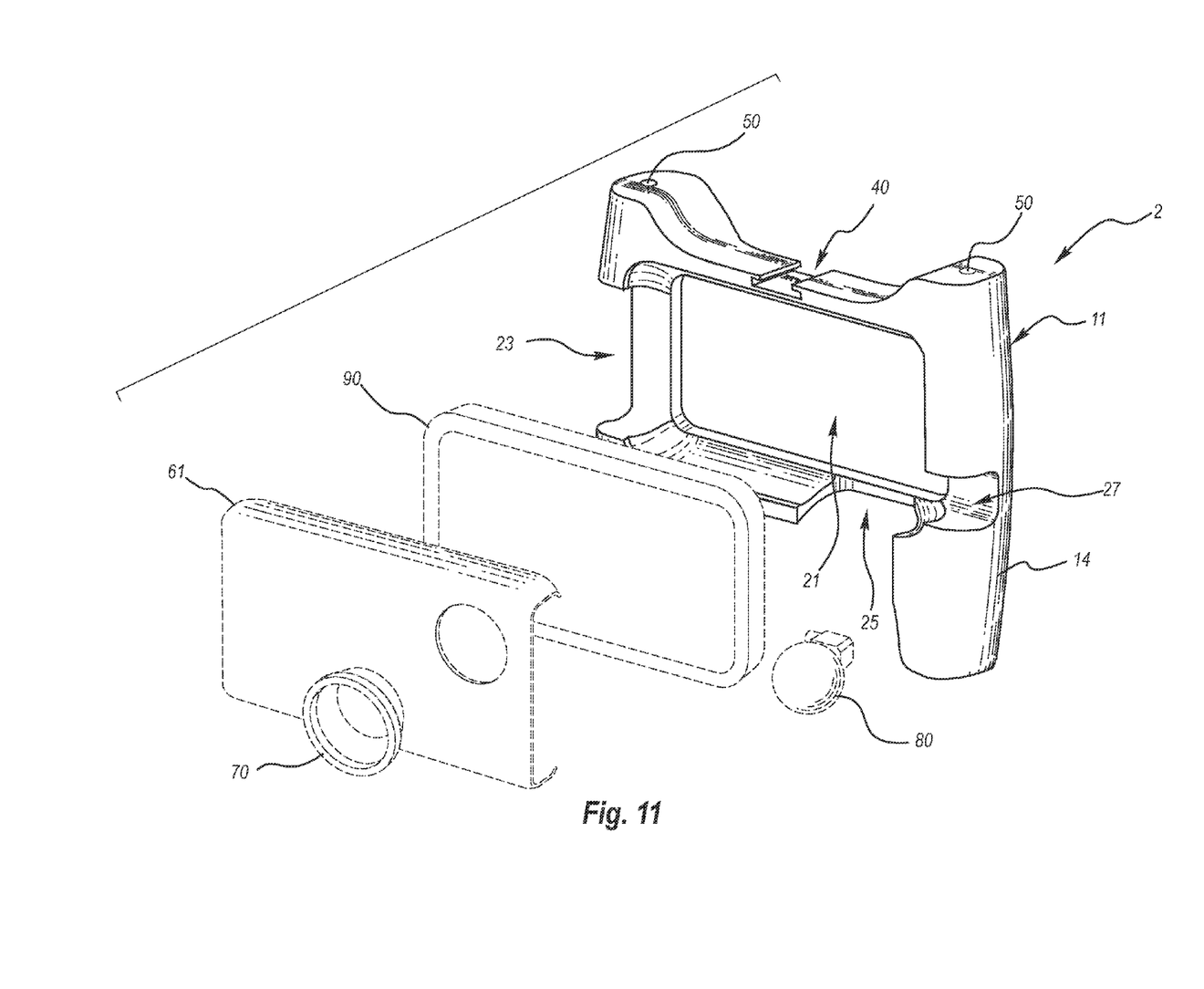
FIG. 11 is an exploded front perspective view of another implementation of a portable media device system.

For the exemplary purposes of this disclosure, turning to FIG. 11, another apparatus for holding a portable media device and portable media device system is shown. Apparatus 2 is similar to apparatus 1 as previously described, the principle difference being body 11, through recess 21 and ports 23, 25, and 27, and the absence of through apertures 28 and 30.

Body 11 defines recess 21 in its front face that is configured to removably receive and hold a portable media device (e.g., iPhone) therein. This recessed area is of a size and shape to securely hold the portable media device by friction fit. Recess 21 is a flanged or shouldered through recess that prevents phone 90 from being pushed through body 11. Body 11 also defines a through port 27 across the right handle 14 opening into the right side of recess 21 that allows for the insertion of audio connections like microphone 80. Body 11 also defines a through port 25 opening into the lower side of recess 20 that allows a user's finger to access media buttons (e.g. volume buttons or switch) on phone 90. Body 11 also defines a through port 23 across the left handle 14 opening into the left side of recess 21 that allows for insertion of external power or data connections like chargers or battery packs.

To facilitate the friction fit securement of phone 90 into recess 21 of body 11 of apparatus 2, case 61 may be included that is resilient. Case 61 slips around phone 90 and then that assembly is press fit into recess 21. Case 61 defines (through its upper right corner) a through aperture for a camera phone lens. This through aperture may be threaded for removably coupling other lenses 70 and filters in front of the camera phone lens.

Thus, a portable media device such as the iPhone 90 is press fit placed in recess 21 using case 61. The top of the iPhone 90 is pointed towards the right of the recess 21 and its lens is aligned with through aperture of case 61. iPhone 90's headphone/microphone jack is aligned with through port 27 for the insertion of audio connections like microphone 80. iPhone 90's media buttons are aligned with through port 25 for access by a user. iPhone 90's dock connector is aligned with through port 23 for insertion of external power or data connections like chargers or battery packs.

When a user wants to release and remove phone 90 from recess 21, all that is required is to push on phone 90 through the through recess 21 from the back face of body 11. Alternatively if nothing is connected to phone 90 through any one of ports 23, 25, or 27, then a user can engage phone 90 through any of those ports and pull phone 90 out of recess 21.

Figures 12, 13:
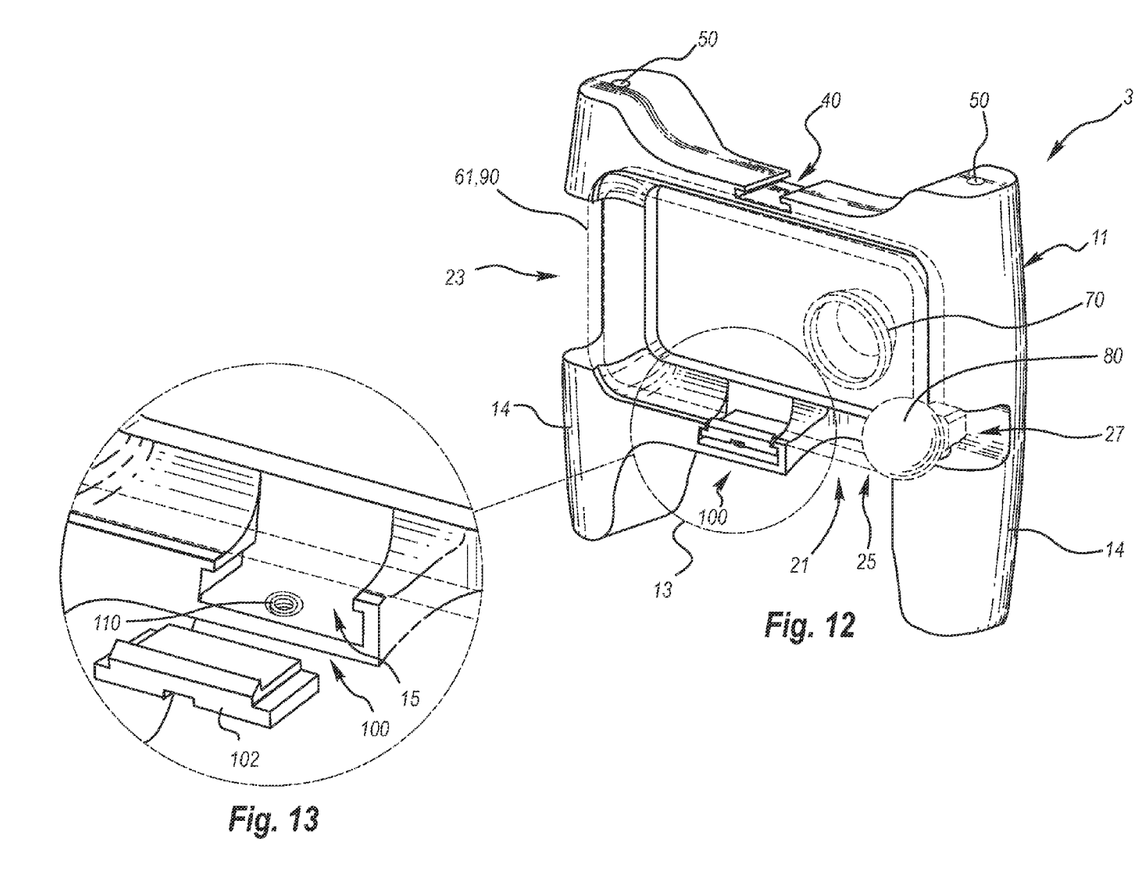
FIG. 12 is an exploded front perspective view of still another implementation of a portable media device system.
FIG. 13 is a portion of the view of the system implementation of FIG. 12 enlarged for magnification purposes.

For the exemplary purposes of this disclosure, turning to FIGS. 12 and 13, another apparatus for holding a portable media device and portable media device system is shown. Apparatus 3 is similar to apparatus 2 as previously described, the principle difference being locking tab assembly 100.

Body 11 defines recess 21 in its front face that is configured to removably receive and hold a portable media device (e.g., iPhone) therein. This recessed area is of a size and shape to securely hold the portable media device by friction fit as well as by locking tab assembly 100. Locking tab assembly 100 is defined into the bottom of recess 21 in body 11. Assembly 100 includes flanged channel 15, spring 110 in the bottom surface of channel 15, and locking tab 102 which is coupled in channel 15. Spring 110 constantly forces locking tab 102 towards recess 21. When phone 90 and case 61 is press fit into recess 21, phone 90 depresses locking tab 102. Once phone 90 passes locking tab 102, locking tab 102 springs back and holds phone 90 in recess 21 until a user depresses locking tab 102 and pushes or pulls phone 90 out of recess.

Figure 14:
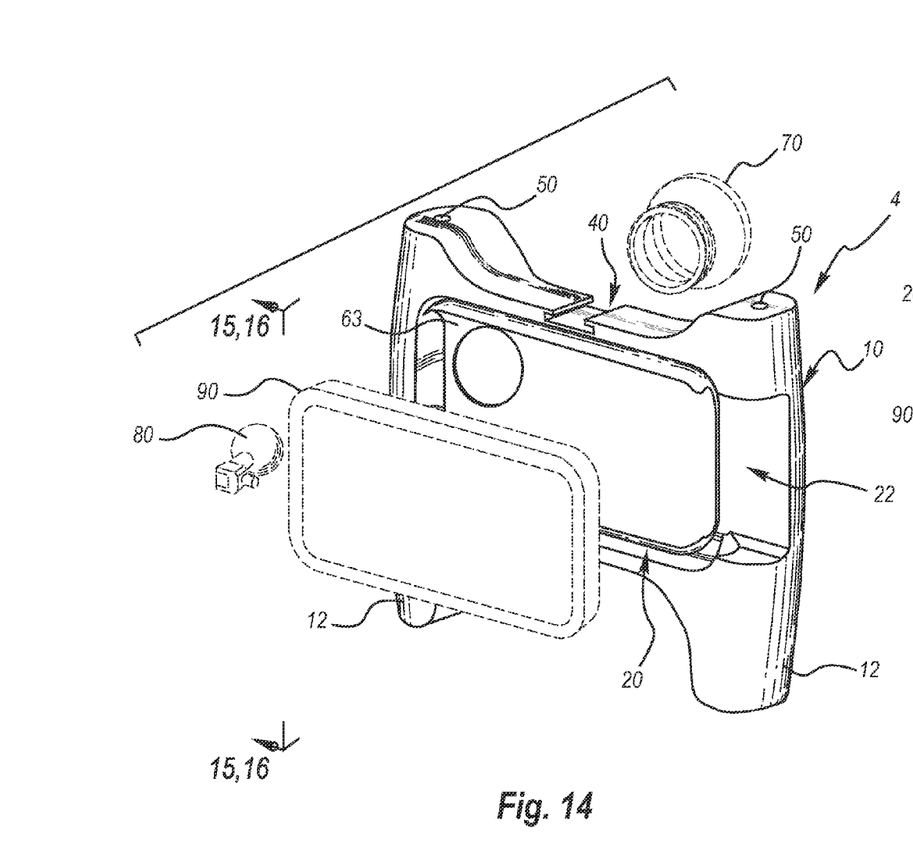
FIG. 14 is an exploded back perspective view of even another implementation of a portable media device system.
Figures 15, 16:
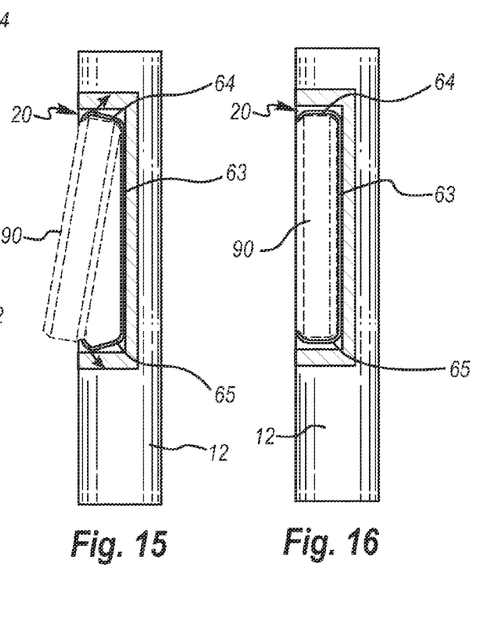
FIGS. 15-16 are cross-sectional views of the system implementation of FIG. 14 taken along line 15,16-15,16.

For the exemplary purposes of this disclosure, turning to FIGS. 14-16, another apparatus for holding a portable media device and portable media device system is shown. Apparatus 4 is similar to apparatus 1 as previously described, the principle difference being case 63.

Case 63 is coupled to or integrally joined to the base of recess 20. Case 63 defines (through its upper left corner) a through aperture for a camera phone lens that aligns with through aperture 28 in body 10. Case 63 includes opposing flanged edges 64 and 65. These edges are resilient enough to flex and spread apart from one another, yet rigid enough to hold phone 90 in recess 20. To install phone 90 into recess 20, one edge of phone 90 is inserted into case adjacent edge 64 or 65. Then the other edge of phone 90 is pushed into case 90. This causes the edges 64 and 65 to spread apart/flex outwardly and when phone 90 snaps in place edges 64 and 65 spring back into position holding phone 90 securely in recess 20.

Further implementations are within the claims.

Specifications, Materials, Manufacture, Assembly

It will be understood that implementations are not limited to the specific components disclosed herein, as virtually any components consistent with the intended operation of an apparatus for holding a portable media device may be utilized. Accordingly, for example, although particular components and so forth, are disclosed, such components may comprise any shape, size, style, type, model, version, class, grade, measurement, concentration, material, weight, quantity, and/or the like consistent with the intended operation of an apparatus for holding a portable media device. Implementations are not limited to uses of any specific components, provided that the components selected are consistent with the intended operation of an apparatus for holding a portable media device.

Accordingly, the components defining any implementation of an apparatus for holding a portable media device may be formed of any of many different types of materials or combinations thereof that can readily be formed into shaped objects provided that the components selected are consistent with the intended operation of a scroll wind generator assembly implementation. For example, the components may be formed of: rubbers (synthetic and/or natural) and/or other like materials; polymers such as thermoplastics (such as ABS, Fluoropolymers, Polyacetal, Polyamide; Polycarbonate, Polyethylene, Polypropylene (low or high density), Polysulfone, and/or the like), thermosets (such as Epoxy, Phenolic Resin, Polyimide, Polyurethane, Silicone, and/or the like), any combination thereof, and/or other like materials; carbon-fiber, aramid-fiber, any combination thereof, and/or other like materials; composites and/or other like materials; metals, such as zinc, magnesium, titanium, copper, iron, steel, carbon steel, alloy steel, tool steel, stainless steel, any combination thereof, and/or other like materials; alloys, such as aluminum alloy, titanium alloy, magnesium alloy, copper alloy, any combination thereof, and/or other like materials; any other suitable material; and/or any combination thereof.

For the exemplary purposes of this disclosure, implementations of the apparatus may be a unibody constructed using a shaped block or billet of aluminum. They can also be made using a plastic. They can also be made using a combination of materials. The cases for the portable media devices may be made of silicone. Nothing in this disclosure should be taken as limiting the materials used to manufacture the apparatus.

Various implementations of an apparatus for holding a portable media device may be manufactured using conventional procedures as added to and improved upon through the procedures described here. Some components may be manufactured simultaneously and integrally joined with one another, while other components may be purchased pre-manufactured or manufactured separately and then assembled with the integral components.

Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of implementations of an apparatus for holding a portable media device are not limited to the specific order of steps as disclosed in this document. Any steps or sequence of steps of the assembly indicated herein are given as examples of possible steps or sequence of steps and not as limitations, since various assembly processes and sequences of steps may be used to assemble implementations.

Use

The aspects and implementations in this document, and many others, will become readily apparent to those of ordinary skill in the art from this disclosure. Those of ordinary skill in the art will readily understand the versatility with which this disclosure may be applied.

Implementations of an apparatus for holding a portable media device are particularly useful in wireless phone applications, such as with the iPhone as previously explained. However, implementations are not limited to uses relating to phones. Rather, any description relating to phone applications is for the exemplary purposes of this disclosure, and implementations may also be used in a variety of applications with similar results for other portable media devices.

In places where the description above refers to particular implementations, it should be readily apparent that a number of modifications may be made without departing from the spirit thereof and that these implementations may be alternatively applied. The accompanying CLAIMS are intended to cover such modifications as would fall within the true spirit and scope of the disclosure set forth in this document. The presently disclosed implementations are, therefore, to be considered in all respects as illustrative and not restrictive, the scope of the disclosure being indicated by the appended CLAIMS rather than the foregoing DESCRIPTION. All changes that come within the meaning of and range of equivalency of the CLAIMS are intended to be embraced therein.

The invention claimed is:

1. An apparatus for holding a portable media device comprising:
    a body comprising:
        a pair of spaced apart and opposing handles that enable a user to hold the portable media device, each handle comprising a flat bottom surface configured to allow the body to stand on its own allowing for hands free photography;
        a recess that is configured to removably receive and hold a portable media device therein, the recess comprising a through aperture defined through a bottom surface of the recess for a lens of the portable media device;
        a first through port across one handle that opens into a first side of the recess and allows for the insertion of audio connections;
        a second through port that opens into a second side of the recess that allows access to media buttons on the portable media device;
        a third through port across the opposite handle that opens into a third side of the recess and allows for insertion of external power or data connections; and
        a shoe bracket at a top of the body between the handles that allows for expansion with accessories.

2. The apparatus of claim 1 wherein the through aperture is threaded for removably coupling a separate lens in front of the lens of the portable media device.

3. The apparatus of claim 1 wherein the body is one of substantially H shaped and inverted U shaped.

4. The apparatus of claim 1 wherein the recess further comprises an ejection through aperture defined through the bottom surface of the recess that a user can utilize to uninstall the portable media device from the recess.

5. The apparatus of claim 1 wherein the recess is in a back face of the body.

6. The apparatus of claim 1 wherein the recess is a shouldered through recess in a front face of the body.

7. A portable media device system comprising:
    an apparatus for holding a portable media device, the apparatus comprising a body comprising:

a pair of spaced apart and opposing handles that enable a user to hold the portable media device, each handle comprising a flat bottom surface configured to allow the body to stand on its own allowing for hands free photography;

a recess that is configured to removably receive and hold a portable media device therein, the recess comprising a through aperture defined through a bottom surface of the recess for a lens of the portable media device;

a first through port across one handle that opens into a first side of the recess and allows for the insertion of audio connections;

a second through port that opens into a second side of the recess that allows access to media buttons on the portable media device;

a third through port across the opposite handle that opens into a third side of the recess and allows for insertion of external power or data connections;

and a shoe bracket at a top of the body between the handles that allows for expansion with accessories; and the portable media device removably coupled to the apparatus in the recess.

8. The system of claim 7 wherein the through aperture is threaded for removably coupling a separate lens in front of the lens of the portable media device.

9. The system of claim 7 wherein the body is one of substantially H shaped and inverted U shaped.

10. The system of claim 7 wherein the recess further comprises an ejection through aperture defined through the bottom surface of the recess that a user can utilize to uninstall the portable media device from the recess.

11. The system of claim 7 wherein the recess is in a back face of the body.

12. The system of claim 7 wherein the recess is a shouldered through recess in a front face of the body.

13. The system of claim 7 wherein the portable media device comprises a smart phone.

14. The system of claim 7 further comprising a case coupled to the portable media device that facilitates a press fit engagement of the portable media device into the recess.

15. The system of claim 7 further comprising an external microphone removably coupled to the portable media device through the first through port.

16. The system of claim 7 further comprising an external lens removably coupled to the body in front of a lens of the portable media device.

* * * * *